United States Patent
Park

(10) Patent No.: US 8,846,223 B2
(45) Date of Patent: Sep. 30, 2014

(54) BATTERY PACK

(71) Applicant: Samsung SDI Co., Ltd., Yongin-si (KR)

(72) Inventor: Kwang-Young Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/710,139

(22) Filed: Dec. 10, 2012

(65) Prior Publication Data

US 2013/0171477 A1  Jul. 4, 2013

(30) Foreign Application Priority Data

Jan. 4, 2012  (KR) .................. 10-2012-0001008

(51) Int. Cl.
*H01M 14/00* (2006.01)
*H01M 2/10* (2006.01)

(52) U.S. Cl.
CPC .............. *H01M 2/105* (2013.01); *Y02E 60/12* (2013.01); *H01M 2/1016* (2013.01); *H01M 2200/00* (2013.01)
USPC .............................................. 429/7; 429/154

(58) Field of Classification Search
CPC ............................ H01M 2/1016; H01M 2/105
USPC ....................................................... 429/7, 154
See application file for complete search history.

(56) References Cited

U.S. PATENT DOCUMENTS

| | | | | |
|---|---|---|---|---|
| 7,531,985 | B2* | 5/2009 | Kim | 320/112 |
| 8,183,831 | B2* | 5/2012 | Moon | 320/112 |
| 2009/0061294 | A1 | 3/2009 | Ahn | |
| 2010/0178548 | A1* | 7/2010 | Baek | 429/154 |
| 2011/0129696 | A1 | 6/2011 | Baek | |
| 2011/0293971 | A1 | 12/2011 | Ho et al. | |
| 2012/0034494 | A1* | 2/2012 | Lee et al. | 429/7 |

FOREIGN PATENT DOCUMENTS

| | | |
|---|---|---|
| JP | 2000-123809 | 4/2000 |
| KR | 10-2009-0118197 | 11/2009 |
| KR | 10-2011-0060164 | 6/2011 |

* cited by examiner

*Primary Examiner* — Stewart Fraser
(74) *Attorney, Agent, or Firm* — Robert E. Bushnell, Esq.

(57) ABSTRACT

A design for a battery pack that provides for a foolproof and easy assembly process, especially during when the protection circuit module is inserted into and combined with the battery case. The protection circuit module includes a circuit substrate with driving circuits arranged on both sides thereof. This circuit substrate is inserted between a first barrier rib of the battery case and a second barrier rib and arranged in parallel thereto. Supporting barrier ribs extending orthogonal from the barrier ribs towards the circuit substrate have a rounded top edge to guide the circuit substrate into the proper location in the battery case. The height of these supporting barrier ribs are formed at least as tall as the barrier ribs to prevent the circuit substrate or the driving circuits from contacting the barrier ribs during the insertion process.

13 Claims, 3 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on the 4 Jan. 2012 and there duly assigned Serial No. 10-2012-0001008.

BACKGROUND OF THE INVENTION

1. Field of the Invention

The present invention relates to a battery pack having a structure that provides for easier and more foolproof assembly.

2. Description of the Related Art

A secondary battery among battery cells capable of charging and discharging is widely used as an energy source in smartphones, laptops, electric tools and electric vehicles.

On the other hand, the structure thereof may be easily varied according to the kinds of apparatuses being powered. For example, when the secondary battery is used as an energy source for a laptop computer, it is possible to configure a plurality of secondary batteries into a battery pack.

In general, the battery pack may include a plurality of secondary batteries, a battery case housing the same, and a protection circuit module. The protection circuit module prevents overcharging and overdischarging of the secondary batteries.

Typically, the protection circuit module may include the circuit substrate, charging and discharging switches mounted on the circuit substrate, and a number of circuit components driving the same. Further, the protection circuit module and the secondary batteries in the battery pack are arranged so that they are spaced-apart from each other, thereby preventing damage to the protection circuit module caused by external forces acting on the secondary batteries.

SUMMARY OF THE INVENTION

An advantage of some aspects of the present invention is that it provides a battery pack having a structure capable of more easily assembling a protection circuit module thereto.

According to one aspect of the present invention, there is provided a battery pack that includes a first case having a bottom portion, first and second housing spaces spaced-apart from each other by a dividing barrier rib having a first height and extending from the bottom portion, at least one battery cell arranged within the first housing space, a protection circuit module arranged within the second housing space and a pair of supporting ribs arranged within the second housing space, and supporting the protection circuit module from the dividing barrier rib, at least one of the supporting ribs extending from the bottom portion and having a height of at least the first height. Each of the pair of supporting ribs may have a top edge that is rounded.

The first case may also include an auxiliary barrier rib extending from the bottom portion, spaced-apart from the dividing barrier rib, and defining the second housing space together with the dividing barrier rib. The pair of supporting ribs may include a first supporting rib supporting the protection circuit module from the dividing barrier rib while having a height of at least the first height and a second supporting rib facing and being spaced-apart from the first supporting rib while supporting the protection circuit module from the auxiliary barrier rib. The dividing barrier rib may be arranged closer to the at least one battery cell than the auxiliary barrier rib. The first supporting rib may be arranged closer to the at least one battery cell than the second supporting rib. The height of the first supporting rib may be greater than the height of the second supporting rib. The first supporting rib may extend towards the protection circuit module from the dividing barrier rib, and the second supporting rib may extend toward the protection circuit module from the auxiliary barrier rib.

The protection circuit module may include a circuit substrate and a driving circuit mounted on the circuit substrate, the first supporting rib contacting both the circuit substrate and the dividing barrier rib, the second supporting rib contacting both the circuit substrate and the auxiliary barrier rib. A length that the first supporting rib extends from the dividing barrier rib may be greater than a thickness of the driving circuit. The driving circuit may include a first driving circuit mounted on a surface of the circuit substrate that faces the dividing barrier rib. The driving circuit may also include a second driving circuit mounted on a surface of the circuit substrate that faces the auxiliary barrier rib. Each of the first and second supporting ribs may include a guide portion having a round shape at a top end thereof. The battery pack may also include a second case coupled to the first case and covering the first and second housing spaces.

The pair of supporting ribs may include a first supporting rib supporting the protection circuit module from the dividing barrier rib while having a height of at least the first height and a second supporting rib facing and being spaced-apart from the first supporting rib while supporting the protection circuit module from the auxiliary barrier rib and having a same height as the auxiliary barrier rib. The auxiliary barrier rib may be arranged in parallel to the dividing barrier rib. The protection circuit module may include a circuit substrate and a driving circuit mounted on the circuit substrate, the circuit substrate may be arranged between the auxiliary barrier rib and the dividing barrier rib and be in parallel to each of the auxiliary barrier rib and the dividing barrier rib. The first supporting rib may extend in a direction that is orthogonal to each of the dividing barrier rib and the bottom portion of the first case, and the second supporting rib may extend in a direction that is orthogonal to each of the auxiliary barrier rib and the bottom portion of the first case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
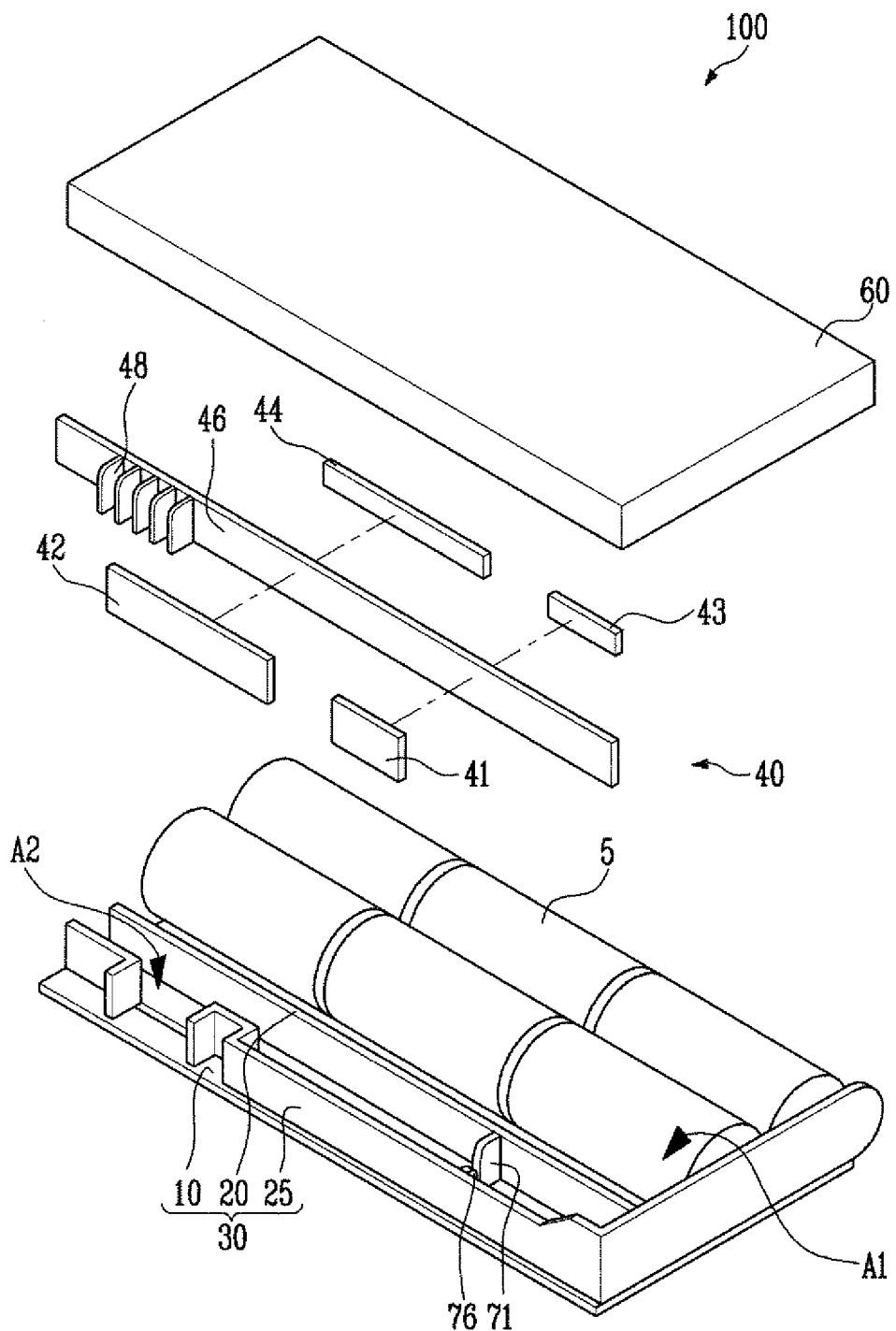
FIG. 1 is an exploded perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, the embodiment of the present invention will be described in detail with reference to the attached drawings. although the preferred embodiments of the present invention are shown and described above, the present invention is not limited to above-described specific embodiment and is variously modified by one skilled in the art without the gist of the present invention claimed in the claim, such that the modified embodiment is not to be understood separately from technical ideas or views of the present invention. On the other hand, the drawings related to the embodiments will be somewhat simplified or exaggerated for a clear description, and like reference numerals refer to like components.

Figure 2:
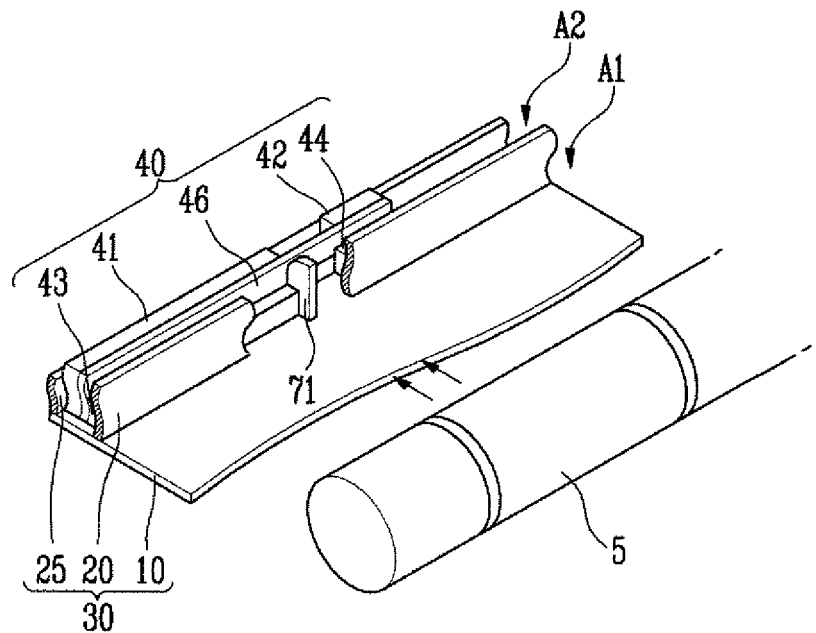
FIG. 2 is a partial prospective view magnifying a first case, a protection circuit module and battery cells of the battery pack of FIG. 1.

Turning now to FIGS. 1 and 2, FIG. 1 is an exploded perspective view of a battery pack 100 according to a first embodiment of the present invention, and FIG. 2 is a partial prospective view of a first case, a protection circuit module and battery cells of the battery pack of FIG. 1. Referring to FIGS. 1 and 2, battery pack 100 includes a battery case having a first case 30 and a second case 60, a plurality of battery cells 5, a protection circuit module 40 and a pair of supporting ribs 70. The first case 30 has a first housing space A1 housing the plurality of battery cells 5 and covering the bottom of the plurality of battery cells 5 and a second housing space A2 housing the protection circuit module 40. Further, the second case 60 is coupled to the first case 30, and covers a top of the battery cells 5 housed within the first case 30.

In more detail, the first case 30 includes a bottom portion 10, a dividing barrier rib 20 and an auxiliary barrier rib 25. The dividing barrier rib 20 included on the bottom portion 10 is extended along one side of the bottom portion 10. In the first case 30, the dividing barrier rib 20 is a component dividing the first housing space A1 and the second housing space A2 so that the first housing space A1 and the second housing space A2 are spaced-apart from each other by the dividing barrier rib 20.

The auxiliary barrier rib 25 on the bottom portion 10 is spaced-apart from the dividing barrier rib 20, extends along one side of the bottom portion 10 and defines the second housing space A2 together with the dividing barrier rib 20. Further, since the auxiliary barrier rib 25 on the bottom portion 10 is positioned closer to an outside of the battery pack 100 than the dividing barrier rib 20, the dividing barrier rib 20 is closer to the battery cells 5 than the auxiliary barrier rib 25.

A number of battery cells 5 are housed within the first housing space A1. In the embodiments of the present invention, each of the battery cells 5 may be chargeable and dischargeable secondary batteries. The protection circuit module 40 is housed within the second housing space A2, is electrically connected to the battery cells 5, and prevents the battery cells 5 from being overcharged and over discharged.

In the embodiments of the present invention, the protection circuit module 40 may include a circuit substrate 46, first to fourth driving circuits 41, 42, 43 and 44, and a connector 48. The circuit substrate 46 may be a printed circuit board, and the protection circuit module 40 may be electrically connected to another external apparatus through the connector 48 which is mounted on the circuit substrate 46. Further, the first to fourth driving circuits 41, 42, 43, and 44, which are mounted on the circuit substrate 46, may include a plurality of charging switches, discharging switches and electronic devices driving the same.

On the other hand, in the embodiments of the present invention, the first and second driving circuits 41 and 42 may be spaced-apart from each other and be arranged on one surface of the circuit substrate 46 while the third and fourth driving circuits 43 and 44 may also be spaced-apart from each other and be arranged on the other surface of the circuit substrate 46. Thus, the first and second driving circuits 41 and 42 are arranged between the circuit substrate 46 and the auxiliary barrier rib 25 and face the auxiliary barrier rib 25, and the third and fourth driving circuits 43 and 44 are arranged between the circuit substrate 46 and the dividing barrier rib 20 and face the driving barrier rib 20.

A pair of supporting ribs 70, which is included in the second housing space A2, includes a first supporting rib 71 and a second supporting rib 76. The first supporting rib 71 extends toward the circuit substrate 46 from the dividing barrier rib 20, and contacts the circuit substrate 46 and the dividing barrier rib 20, such that the protection circuit module 40 is supported from the dividing barrier rib 20. Further, the second supporting rib 76 extends toward the circuit substrate 46 from the auxiliary barrier rib 25, and contacts the circuit substrate 46 and the auxiliary barrier rib 25, such that the protection circuit module 40 is also supported from the auxiliary barrier rib 25. The protection circuit module 40 may be stably housed within the second housing space A2 by the first and second supporting ribs 71 and 76 having the above-described structure. The structures of the first and second supporting ribs 71 and 76 will be described in more detail as follows with reference to FIGS. 3A and 3B.

Figure 3A:
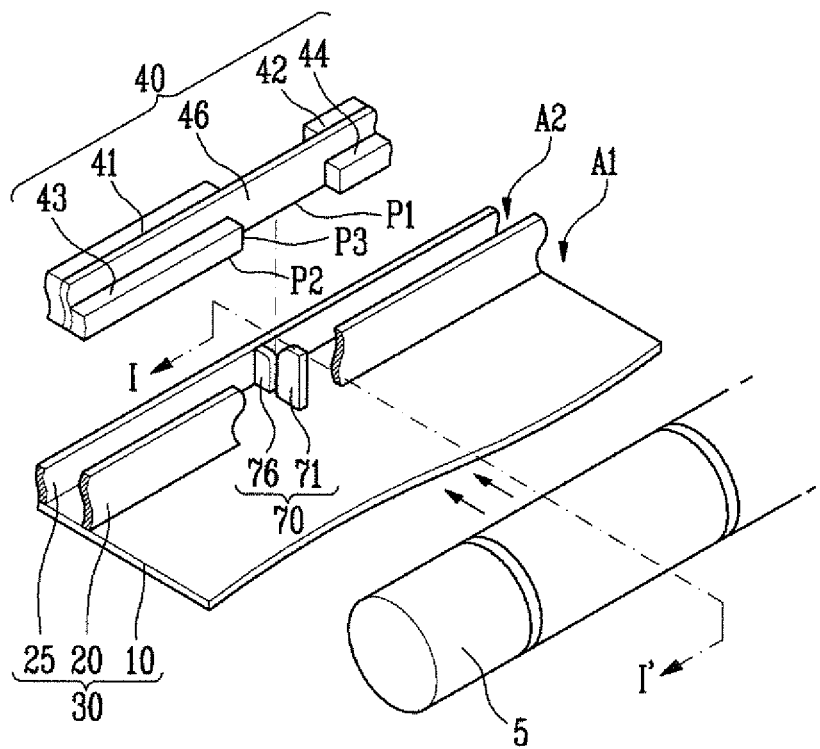
FIG. 3A is an exploded prospective view showing the first case, the protection circuit module and the battery cells of FIG. 2 prior to being combined.
Figure 3B:
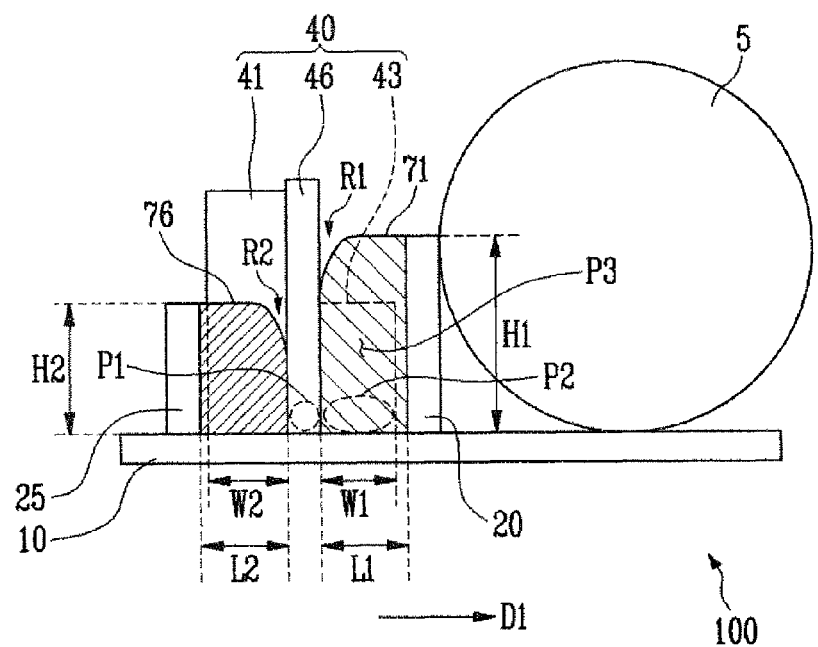
FIG. 3B is a cross-sectional view taken by line I-I' of FIG. 3A.

Turning now to FIGS. 3A and 3B, FIG. 3A is an exploded prospective view showing the first case 30, the protection circuit module 40 and battery cells 5 illustrated in FIG. 2 but prior to being combined, and FIG. 3B is a cross-sectional view taken by line I-F of FIG. 3A.

Referring to FIGS. 3A and 3B, the first supporting rib 71 contacts the circuit substrate 46 and the dividing barrier rib 20, such that the circuit substrate 46 is supported from the dividing barrier rib 20. In the embodiments of the present invention, the first supporting rib 71 extends a first length L1 from the dividing barrier rib 20, where L1 is equal to or greater than the thickness W1 of the third driving circuit 43. By having L1 equal to or greater than a thickness W1 of third driving circuit 43, enough space is provided for third driving circuit 43 to fit between dividing barrier rib 20 and circuit substrate 46.

Further, the second supporting rib 76 contacts the circuit substrate 46 and the auxiliary barrier rib 25, such that the circuit substrate 46 is supported from the auxiliary barrier rib 25. In the embodiments of the present invention, the second supporting rib 76 extends a second length L2 from auxiliary barrier rib 25, where the second length L2 is equal to or greater than the thickness W2 of the first driving circuit 41. By having second length L2 equal to or greater than thickness W2 of the first driving circuit 41, the first driving circuit 41 can easily fit between the auxiliary barrier rib 25 and the circuit substrate 46.

Another design consideration of the embodiment of the present invention illustrated in FIGS. 3A and 3B pertains to the relationship between the heights of the supporting ribs 71 and 76 and the heights of the barrier ribs 20 and 25 respectively. In FIGS. 3A and 3B, when the height of the dividing barrier rib 20 extending upward from the bottom portion 10 is defined as a first height H1, the height of the first supporting rib 71 from the bottom portion 10 in the first embodiment of the present invention is equal to first height H1. By having the first supporting rib 71 as tall as dividing barrier rib 20, the process of inserting the protection circuit module 40 into the first case 30 is more foolproof and less prone to error as the barrier ribs 20 and 25 are less apt to interfere with the driving circuits 41, 42, 43 and 44. The first bottom end P1 of the circuit substrate 46 is inserted between the first and second supporting ribs 71 and 76 to couple the circuit substrate 46 to the first case 30. This process is defined as the insertion process of the protection circuit module 40. By having the supporting ribs 71 and 76 be sufficiently tall enough, workers may more easily perform the insertion process of the protection circuit module. This will be described in more detail as follows.

Unlike the embodiment of the present invention, when the height of the first supporting rib 71 is lower than that of the dividing barrier rib 20, the heights of the top ends of the first supporting rib 71 and the dividing barrier rib 20 are different from each other. Therefore, in early stage of the insertion process of the protection circuit module 40, since the bottom end P2 and a side P3 of driving circuit 43 may contact with and jam into the dividing barrier rib 20 prior to contacting and being guided by rounded top edge R1 of first supporting rib 71, thereby frustrating the insertion process and possibly causing damage to the third driving circuit 43 or causing the third driving circuit to move or become separated from the circuit substrate 46.

However, in the structure of the first supporting ribs 71 according to the first embodiment of the present invention, when the workers perform the insertion process of the protection circuit module 40, since the heights of the top ends of the first supporting rib 71 and the dividing barrier rib 20 are the same, the bottom end P2 and the side P3 of the third driving circuit 43 are guided by the rounded top edge R1 of the first supporting rib 71 in early stage of the insertion process, such that the third driving circuit 43 may be safely and smoothly inserted into the proper position in first case 30. That is, in the insertion process of the protection circuit module 40, an occurrence of the third driving circuit 43 being interfered by the dividing barrier rib 20 is avoided, providing an easy and foolproof insertion process for workers assembling the battery pack.

Furthermore, in the embodiments according to the present invention, when inserting the protection circuit module 40 into the first case 30, the top ends of each of the first and second supporting ribs 71 and 76 may have guide portions R1 and R2 respectively having a round shape so that the first bottom end P1 of the circuit substrate 46 can be easily inserted between the first and second supporting ribs 71 and 76. Therefore, even when an assembly worker, during the insertion process, tries to insert the circuit substrate 46 at a location slightly deviated in the D1 or −D1 direction of FIG. 3B from the exact correct position, the top rounded edges R1 and R2 of first and second supporting ribs 71 and 76 can guide circuit substrate 46 smoothly to the correct location without having any of the driving circuits 41, 42, 43 or 44 contacting any of the barrier ribs 20 or 25.

Further, in the embodiments according to the present invention, the height of the second supporting rib 76 may have the same height H2 as the auxiliary barrier rib 25. Thus, like the effect realized by the structure of the first supporting rib 71 described above, the phenomenon that the first driving circuit 41 being interfered by the auxiliary barrier rib 25 during the insertion process is avoided, such that the workers may quickly and easily perform the insertion process of the protection circuit module 40.

Figure 4:
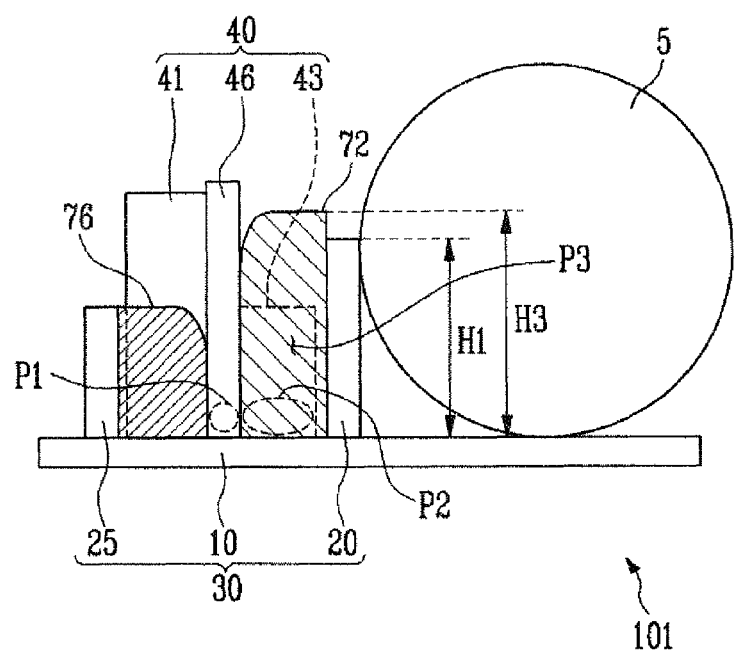
FIG. 4 is a cross-sectional view of a battery pack according to another embodiment of the present invention.

Turning now to FIG. 4, FIG. 4 is a cross-sectional view of a battery pack 101 according to a second embodiment of the invention. In the description of the second embodiment of FIG. 4, with the exception of the first supporting rib, since the battery pack 101 shown in FIG. 4 includes the same components as the battery pack 100 of FIGS. 1 to 3B of the first embodiment, like reference numerals are used to refer to like components and a duplicated description thereof will be omitted.

Referring now to FIG. 4, the dividing barrier rib 20 has the first height H1, and the first supporting rib 72 has a second height H3 that is higher than the first height H1. Therefore, upon performing the insertion process of the protection circuit module described previously with reference to FIGS. 3A and 3B, the side P3 of the third driving circuit 43 is guided to be inserted into the proper position by the first supporting rib 72, and then the bottom end P2 of the third driving circuit 43 is guided to be inserted into the proper position by the dividing barrier rib 20.

As a result, when the side P3 of the third driving circuit 43 deviates from the exact position during the insertion process of the protection circuit module, a occurrence of the third driving circuit 43 being interfered by the dividing barrier rib 20 is prevented, thereby allowing for a smooth, foolproof and easily insertion process of the protection circuit module.

By employing the structures of the battery packs according to the embodiments of the present invention, the supporting ribs are sufficiently high enough to guide the protection circuit module so that the protection circuit module can be assembled to the proper position without a driving circuit being interfered by the dividing barrier rib of the case. As a result, it is possible to provide a foolproof and easy operation assembling the protection circuit module into the case by workers in a fast-paced production environment.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
  a first case having a bottom portion, first and second housing spaces spaced-apart from each other by a dividing barrier rib having a first height and extending from the bottom portion;
  at least one battery cell arranged within the first housing space;
  a protection circuit module including a circuit substrate arranged within the second housing space; and
  a first supporting rib arranged on an opposite side of the circuit substrate than a second supporting rib, the first and the second supporting ribs being arranged within the second housing space, the first supporting rib supporting the protection circuit module from the dividing barrier rib, wherein each of the first and second supporting ribs comprise a guide portion having a round shape at a top end thereof.

2. The battery pack of claim 1, wherein the first case further comprises an auxiliary barrier rib extending from the bottom portion, spaced-apart from the dividing barrier rib, and defining the second housing space together with the dividing barrier rib, the second supporting rib supporting the protection circuit module from the auxiliary barrier rib.

3. The battery pack of claim 1, wherein the
first supporting rib has a height of at least the first height; and
the second supporting rib facing and being spaced-apart from the first supporting rib by a gap substantially equal to a thickness of the circuit substrate.

4. The battery pack of claim 2, wherein the dividing barrier rib is arranged closer to the at least one battery cell than the auxiliary barrier rib.

5. The battery pack of claim 2, wherein the first supporting rib is arranged closer to the at least one battery cell than the second supporting rib.

6. The battery pack of claim 1, wherein the height of the first supporting rib is greater than the height of the second supporting rib.

7. The battery pack of claim 1, wherein the protection circuit module further comprises
a first driving circuit mounted on the circuit substrate and facing the dividing barrier rib, wherein a length that the first supporting rib extends from the dividing barrier rib is greater than a thickness of the first driving circuit.

8. The battery pack of claim 7, wherein the protection circuit module further comprises a second driving circuit mounted on a surface of the circuit substrate that faces the auxiliary barrier rib, wherein a length that the second supporting rib extends from the auxiliary barrier rib is greater than a thickness of the second driving circuit.

9. The battery pack of claim 1, further comprising a second case coupled to the first case and covering the first and second housing spaces.

10. The battery pack of claim 2, wherein the
second supporting rib has a same height as the auxiliary barrier rib and is less than the height of the first supporting rib.

11. The battery pack of claim 2, the auxiliary barrier rib being arranged in parallel to the dividing barrier rib.

12. The battery pack of claim 11, wherein the
circuit substrate, the circuit substrate is arranged between the auxiliary barrier rib and the dividing barrier rib and extends in parallel to each of the auxiliary barrier rib and the dividing barrier rib.

13. The battery pack of claim 3, the first supporting rib extending in a direction that is orthogonal to each of the dividing barrier rib and the bottom portion of the first case, and the second supporting rib extending in a direction that is orthogonal to each of the auxiliary barrier rib and the bottom portion of the first case.

* * * * *